(12) United States Patent
Sergyeyenko

(10) Patent No.: US 10,651,664 B2
(45) Date of Patent: May 12, 2020

(54) PORTABLE BATTERY CHARGER SYSTEM

(71) Applicant: Black & Decker Inc., Newark, DE (US)

(72) Inventor: Oleksiy P. Sergyeyenko, Baldwin, MD (US)

(73) Assignee: BLACK & DECKER INC., New Britain, CT (US)

( * ) Notice: Subject to any disclaimer, the term of this patent is extended or adjusted under 35 U.S.C. 154(b) by 239 days.

(21) Appl. No.: 15/681,099

(22) Filed: Aug. 18, 2017

(65) Prior Publication Data

US 2019/0058339 A1 Feb. 21, 2019

(51) Int. Cl.
*H02J 7/00* (2006.01)

(52) U.S. Cl.
CPC .......... *H02J 7/0045* (2013.01); *H02J 7/0021* (2013.01); *H02J 7/0026* (2013.01); *H02J 2007/0039* (2013.01)

(58) Field of Classification Search
CPC .................................................... H02J 7/0045
USPC ............................................................ 320/112
See application file for complete search history.

(56) References Cited

U.S. PATENT DOCUMENTS

| | | | |
|---|---|---|---|
| 4,641,076 A | * | 2/1987 | Linden ...................... A61L 2/00 320/113 |
| 5,316,210 A | * | 5/1994 | Scullin ............... B65D 5/48048 229/117.16 |
| 6,870,089 B1 | | 3/2005 | Gray |
| 7,334,680 B2 | | 2/2008 | Cunningham et al. |
| 7,619,884 B1 | | 11/2009 | Gray |
| 8,415,921 B1 | | 4/2013 | Young et al. |
| 8,415,924 B2 | | 4/2013 | Matthias et al. |
| 8,593,108 B2 | | 11/2013 | Ferber et al. |
| 8,890,478 B2 | | 11/2014 | Glauning et al. |
| 9,112,356 B2 | | 8/2015 | Cover |
| 9,379,561 B2 | | 6/2016 | Rejman |
| 9,419,258 B2 | | 8/2016 | Pickens et al. |
| 9,419,446 B2 | | 8/2016 | Pickens et al. |
| 9,419,454 B2 | | 8/2016 | Pickens et al. |
| 9,419,456 B2 | | 8/2016 | Pickens et al. |
| 9,425,632 B2 | | 8/2016 | Pickens et al. |
| 9,906,055 B2 | * | 2/2018 | Taga ..................... H02J 7/0045 |
| 2006/0170395 A1 | | 8/2006 | Yoshimizu et al. |
| 2008/0035507 A1 | | 2/2008 | Collister et al. |
| 2012/0262117 A1 | | 10/2012 | Ferber et al. |
| 2012/0326669 A1 | | 12/2012 | Horiyama et al. |
| 2014/0103858 A1 | | 4/2014 | Bertsch et al. |
| 2014/0166516 A1 | | 6/2014 | Martinez et al. |
| 2015/0247831 A1 | | 9/2015 | Lewis et al. |
| 2015/0283694 A1 | | 10/2015 | Goto et al. |
| 2015/0326044 A1 | | 11/2015 | Ashley et al. |

(Continued)

FOREIGN PATENT DOCUMENTS

| | | |
|---|---|---|
| DE | 102012213047 A1 | 1/2014 |
| JP | 11299528 A | 11/1999 |

*Primary Examiner* — Jerry D Robbins
(74) *Attorney, Agent, or Firm* — Michael Aronoff

(57) ABSTRACT

A battery pack charger system including a case configured to store and transport a plurality of battery packs, and a charging system coupled to an outside of the case. The case may include a housing and a lid. The charging system may include a plate member and a plurality of chargers. The plurality of chargers may be arranged in parallel with respect to each other on the plate member.

20 Claims, 14 Drawing Sheets

(56) References Cited

U.S. PATENT DOCUMENTS

| | | | |
|---|---|---|---|
| 2015/0333544 A1* | 11/2015 | Toya | H01M 10/48 320/112 |
| 2016/0056731 A1* | 2/2016 | Brotto | H02J 7/0042 363/60 |
| 2017/0135456 A1* | 5/2017 | Schartle | A45C 11/36 |
| 2019/0070995 A1* | 3/2019 | Cantrell | B60P 3/007 |

* cited by examiner

PORTABLE BATTERY CHARGER SYSTEM

TECHNICAL FIELD

This description relates to a battery pack charger system.

BACKGROUND

When a battery-operated power tool is transported to a work site, a storage case may be used to conveniently transport the power tool and auxiliary related devices, such as a charger and a battery pack(s). However, even when a user carries the storage case to the work site, the user generally discharges power from the battery pack faster than the battery pack is able to be charged, and the availability of charging power sources (e.g., AC outlet, DC cigarette lighter outlet, etc.) is often unavailable or limited and/or does not provide enough power and energy to keep up with demand.

SUMMARY

In one general aspect, a system may include a case configured to store and transport a plurality of battery packs, and a charging system coupled to an outside of the case. The case may include a housing having a lid. The charging system may include a plate member and a plurality of chargers. The plurality of chargers may be arranged parallel with respect to each other on the plate member.

Implementations may include one or more of the following features. For example, the plate member may be coupled to a front side of the housing. The plate member may be coupled to the housing by a fastening element. The plate member may include a plurality of protrusion members at a bottom edge thereof to stabilize the case. The plate member may include a channel member configured to wrap an electrical cord. A first part of the channel member may be located at a top edge of the plate member and a second part of the channel member may be located at a bottom edge of the plate member. The plate member may include a cord retention member configured to hold an end of an electrical cord. The plate member may include a pair of guide members configured to engage corresponding guide rails of a slide-on style battery pack. The pair of guide members may be located above each of the plurality of chargers. The slide-on style battery pack may engage the pair of guide members on the plate member in a vertical direction. The housing may include a partition to divide an interior space into a first compartment and a second compartment. The first compartment may include a first liner with a first color to designate used battery packs, and the second compartment may include a second liner with a second color to designate fully charged battery packs. The lid may include a zipper to close the lid around the housing.

In another general aspect, a system may include a case configured to store and transport a power tool and a plurality of battery packs, and a charging system located inside of the case. The case may include a housing having a lid and a partition member configured to form a plurality of compartments. The partition member may be attachable/detachable from the housing. The charging system may include a charger having a plurality of charging ports to charge a plurality of battery packs.

Implementations may include one or more of the following features. For example, the partition member may be substantially H-shape formed inside of the housing. The partition member may be attachable/detachable from the housing using a hook and loop fastener.

The system may include a mesh window on the lid. When the lid is closed, a location of the mesh window may correspond to a location where the charger is located inside of the case. The system may further include a charger mounting system. The charger mounting system may include a pair of mounting devices and a pair of rivets. The pair of mounting devices may be attached to a back surface of the charger located inside of the case. Each of the mounting devices may include a first opening and a second opening to insert the respective rivets thereto. The first opening may be larger than the second opening.

The details of one or more implementations are set forth in the accompanying drawings and the description below. Other features will be apparent from the description and drawings.

DETAILED DESCRIPTION

Example embodiments relate to a battery pack charger system including a case configured to store and transport a plurality of battery packs and a charging system coupled to an outside of the case. The case may include a housing and a lid. The charging system may include a plate member and a plurality of chargers, wherein the plurality of chargers are arranged parallel with respect to each other, on the plate member. This permits a user to carry numerous battery packs to a work site and charge more than one battery pack at a time to reduce charging time.

Further, a charger system located outside of a storage case enables a user to recharge a battery pack(s) without having to open the storage case, pull out auxiliary devices, such as a battery charger and/or a power cord, and then repack the auxiliary devices back into the storage case when the battery pack(s) is finished charging.

Further, the charging energy may be used to charge multiple, removable battery packs, which may be used to provide power to various cordless equipment. For example, the removable battery packs may be used to provide power to cordless power tools, cordless lawn tools, cordless radios, etc. The battery pack charger system may be implemented to connect to various different equipment such that the same battery pack charger system may be used for different types or different brands of equipment.

Figure 1A:
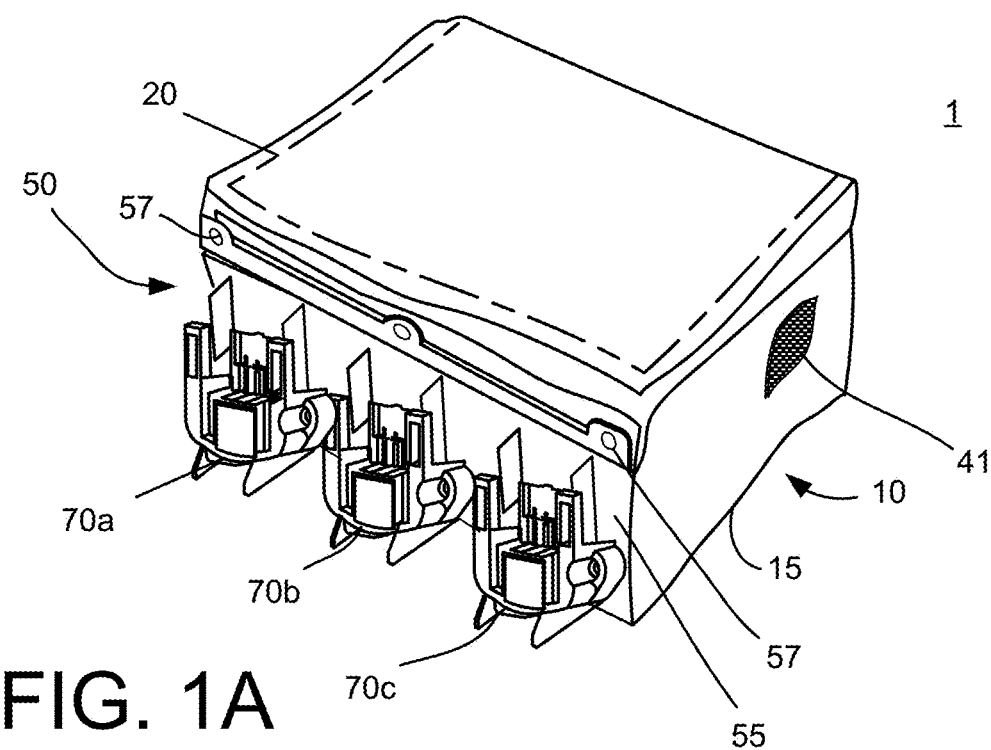
FIGS. 1A and 1B are perspective views of a battery pack charger system in accordance with an example embodiment.
Figure 1B:
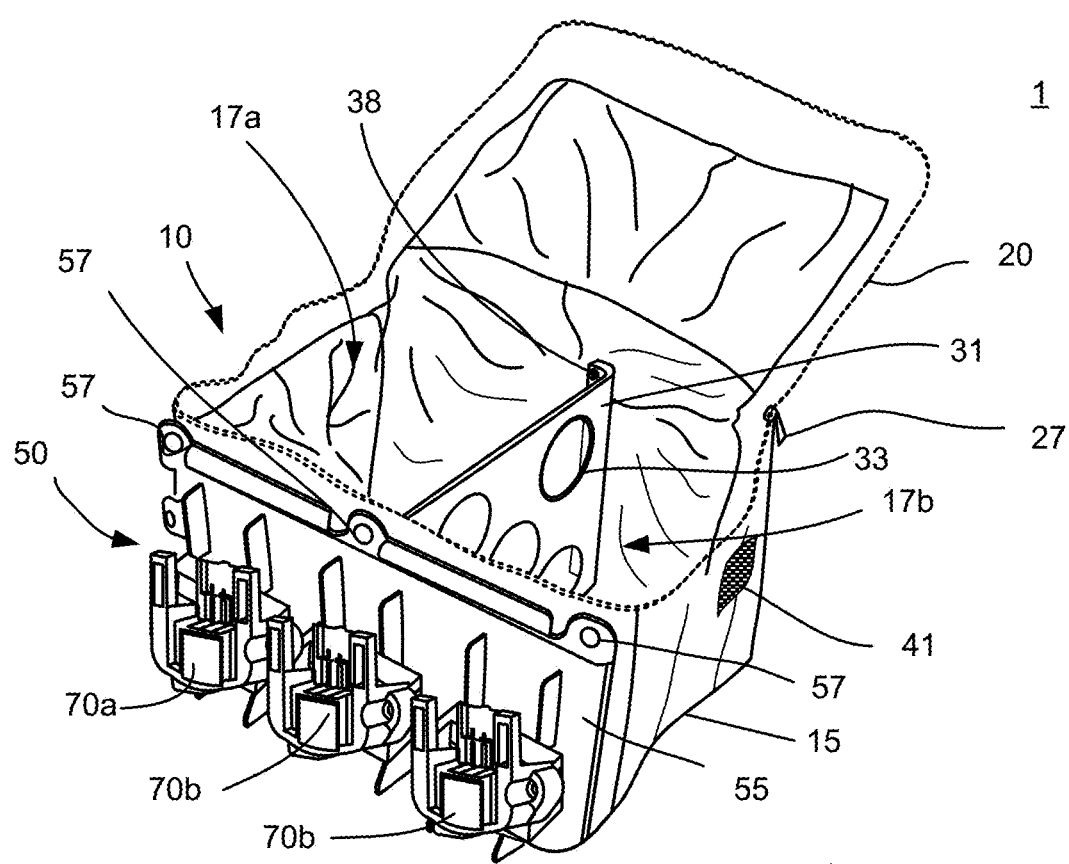
Figure 2:
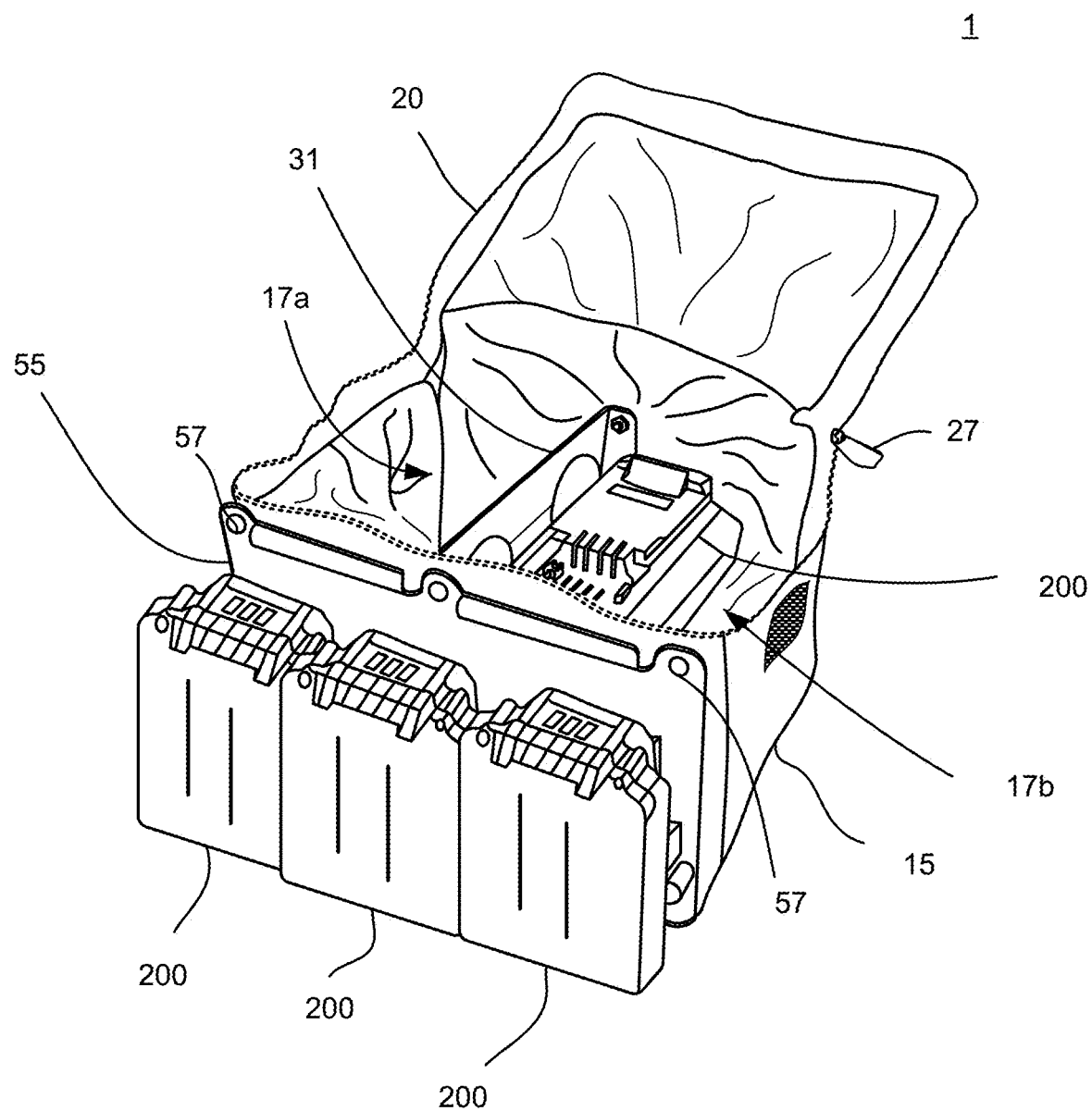
FIG. 2 is another perspective view of the battery pack charger system of FIG. 1.

FIGS. 1A and 1B and FIG. 2 are perspective views of a battery pack charger system 1 in accordance with an example embodiment. Referring to FIGS. 1A and 1B, the system 1 may include a storage case 10 and a charging system 50 coupled to the storage case 10. FIG. 1A illustrates the storage case 10 in a closed position, and FIG. 1B illustrates the storage case 10 in an open position.

As shown in FIG. 1B, the storage case 10 may include a housing 15 configured to store and transport a plurality of battery packs 200 (as shown in FIG. 2) and/or a power tool. In some implementations, the housing 15 may have a first compartment 17a and a second compartment 17b. The housing 15 can be constructed from nylon, canvas, vinyl, plastic, metal, wood, or any other suitable material and may be sized to allow a user to carry the storage case 10 by hand. A handle (not shown) may be attached to sides of the housing 15 to allow a user to carry the storage case 10, and can be, for example, a single over the shoulder strap, a double strap, a backpack style strap, a handle, or the like.

A lid 20 may be hinged to the housing 15 on one side of the storage case 10 to cover the first and second compartments 17a, 17b. The lid 20 may be constructed from the same material as the housing 15. In some implementations, the lid 20 may be closed and opened using a fastener. For example, the lid 20 may include a zipper 27 to open and close the lid 20. Other fasteners, such as, but not limited to, snaps, hook and loop fasteners, clips, pins, staples, magnets, etc. may be employed to open and close the lid 20.

The first compartment 17a and the second compartment 17b may be divided by a partition member 31. The first and second compartments 17a, 17b may be the same size or different sizes. The partition member 31 may be constructed from plastic, metal, wood, or any other suitable material. The partition member 31 may include openings 33 to provide heat transfer within the housing 15. The openings 33 also reduce weight of the partition member 31, and hence, reduce a total weight of the storage case 10.

In some implementations, the partition member 31 may be employed to identify and divide a type (condition) of battery packs 200. For example, the first compartment 17a may be employed to store fully charged battery packs 200 and the second compartment 17b may be employed to store used battery packs 200. An exemplary manner in which the two compartments 17a, 17b may be distinguished is one of the compartments (e.g., first compartment 17a) may be lined with a first color (e.g., green) to identify battery packs 200 that are fully charged stored therein (or to be placed therein), and the other compartment (e.g., second compartment 17b) may be lined with a second color (e.g., red) to identify battery packs 200 are used stored therein (or to be placed therein). In some implementations, the first compartment 17a and the second compartment 17b may be identified using labels (e.g., "used" and "charged"). In some other implementations, the first compartment 17a and the second compartment 17b may be identified using symbols (e.g., "X" and "O").

In some implementations, the partition member 31 may be attached to the housing 15 inside thereof with a fastener 38. For example, the partition member 31 may be attached to the housing 15 by a screw. In some other implementations, the partition member 31 may be attached to the housing 15 using other fasteners, such as, for example, a nut and bolt, a clap, a clip, a staple, glue, etc. In yet other implementations, the partition member 31 may be attachable/detachable from the housing 15 using fasteners, for example, but not limited to, hook and look fasteners, snaps, zippers, magnets, etc.

In some implementations, the first and second compartments 17a, 17b may have a lining to protect the devices inside. For example, the first and second compartments 17a, 17b may be lined with felt, fleece, foam, sponge, cork, or some other material to protect the devices.

In some implementations, the first and second compartments 17a, 17b may be thermally insulated to control a temperature inside of the housing 15. For example, the first and second compartments 17a, 17b may be lined with fiberglass, mineral wool, cellulose, polyurethane foam, polystyrene, cork, or some other material to thermally insulate the devices within the housing 15.

One side on an exterior surface of the housing 15 includes a vent window 41 to remove heat from the inside of the housing 15. In an exemplary embodiment as illustrated, the vent window 41 may be mesh. In some implementations, a vent window 41 may be located on both sides of the housing 15.

Figure 3:
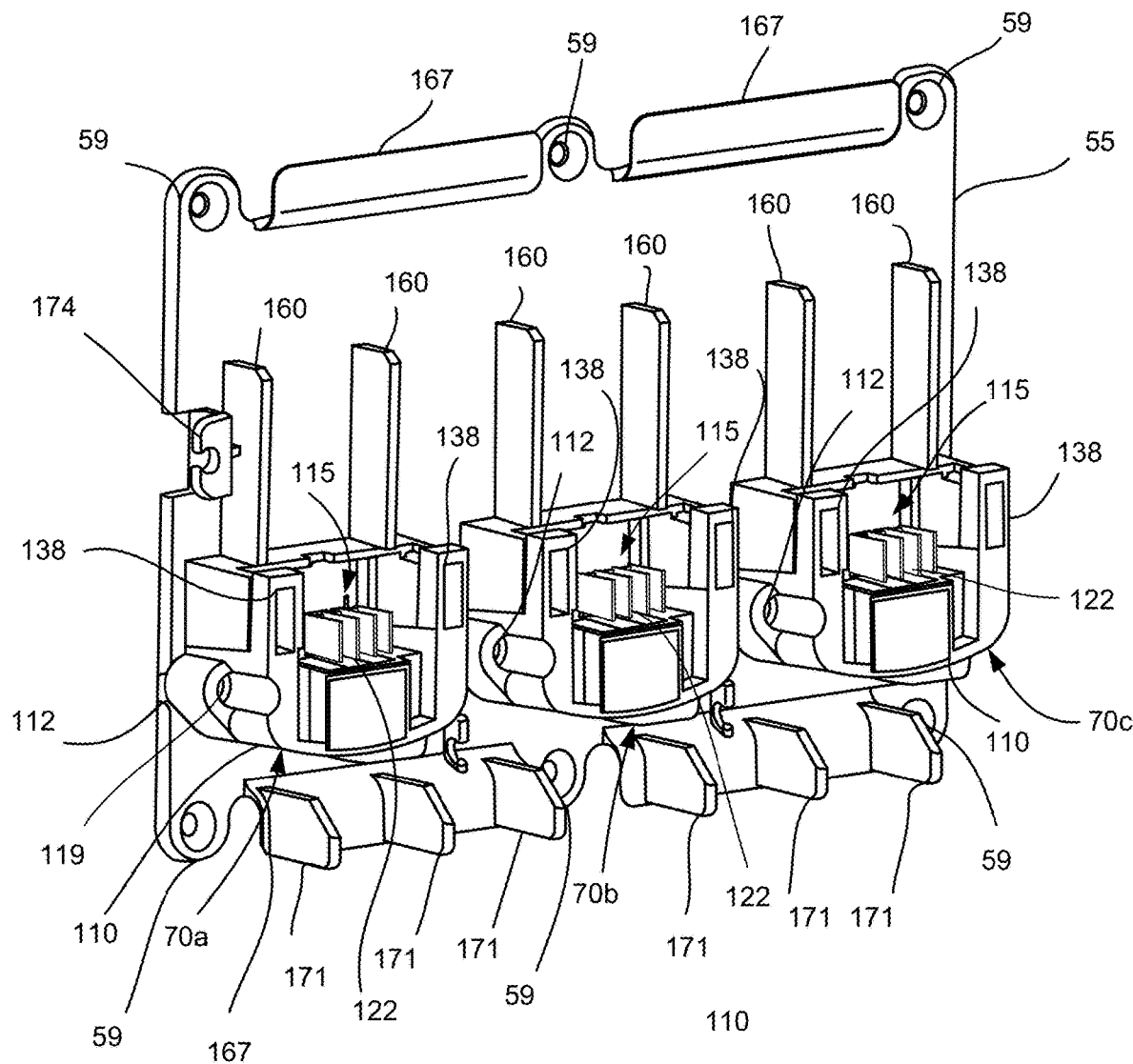
FIG. 3 is a perspective view of an exemplary charger system of the battery pack charger system of FIG. 1.

Attached at a front side of the housing 15 is a charging system 50 including a charging plate 55. In some implementations, the charging plate 55 may be attached to an exterior surface at the front side of the housing 15. The charging plate 55 may be attached to the housing 15 using a fastener 57, such as, for example, a screw inserted into a screw boss 59 (as shown in FIG. 3) of the charging plate 55. Other fasteners, including but not limited to, nut and bolt, claps, clips, staples, glue, etc. may be employed to attach the charging plate 55 to the housing 15. In an exemplary embodiment as illustrated, the fasteners 57 may be secured near each corner of the charging plate 55 and at a middle portion of longitudinal sides of the charging plate 55. It should be appreciated that more or fewer fasteners 57 may be employed to attach the charging plate 55 to the housing 15 as long as the charging plate 55 is tightly secured to the housing 15. The charging plate 55 may be constructed from plastic, metal, wood, or any other suitable material.

Referring to FIG. 1-3, the charging plate 55 may include a plurality of chargers 70a, 70b, 70c which may be attached to the charging plate 55 via a screw 119 inserted into a screw boss 112 in the respective chargers 70a, 70b, 70c. In some implementations, the chargers 70a, 70b, 70c may be arranged next to one another. In an exemplary embodiment as illustrated, there are three chargers 70a, 70b, 70c on the charging plate 55 arranged in a parallel configuration next to each other. It should be appreciated that each charger 70a, 70b, 70c may be the same (or substantially identical) and therefore, the components and/or elements described for one charger may be used to describe the other chargers.

Each of the chargers 70a, 70b, 70c may include a housing 110 having a charging port 115 for receiving and charging the battery pack 200. The housing 110 may be generally composed of plastic material, such as, for example polyethylene, polypropylene, and/or polyurethane, and may enclose components of the chargers 70a, 70b, 70c. In some implementations, the housing 110 may house at least a charging circuit (not shown) to control functions and/or operations of the chargers 70a, 70b, 70c.

The housing 110 may include openings for which a plurality of terminal blades 122 extends out therefrom. The plurality of terminal blades 122 may be electrically coupled to the charging circuit to provide a charge to the battery pack 200 when the battery pack 200 is connected to the charging port 115. The plurality of terminal blades 122 can also communicate with the battery pack 200 to determine at least one function, for example, detection of the battery pack 200, voltage of the battery pack 200, temperature of the battery pack 200, and/or if the battery pack 200 is experiencing a fault. In some implementations, two of the blade terminals may be used for positive and negative terminals, one blade terminal may be used for current or voltage measurements, and one blade terminal may be used for battery pack identification.

In some implementations, besides having four terminal blades, there may be more or fewer terminal blades while communicating the same operations and/or functions. For example, instead of the four terminal blade arrangement, the housing 110 may house two terminal blades up to six terminal blades.

The housing 110 may include a connecting structure having two spaced apart, parallel guide rails 138. The guide rails 138 may be integrally molded with the housing 110 and may be configured to cooperate with corresponding pairs of guide rails of the battery pack 200. The guide rails 138 may also be used to properly align the battery pack 200 prior to engaging with the plurality of terminal blades 122.

The charging plate 55 may further include a pair of guide rails 160 above each of the respective chargers 70a, 70b, 70c. The pair of guide rails 160 may be integrally molded with the charging plate 55. In some implementations, the pair of guide rails 160 may be generally composed of the same material as the charging plate 55. For example, the pair of guide rails 160 and the charging plate 55 may be formed from a plastic material, for example polyethylene, polypropylene, and/or polyurethane. The pair of guide rails 160 acts as a first alignment device prior to the battery pack 200 engaging with the respective chargers 70a, 70b, 70c. In other words, the battery pack 200 is inserted into the charging port 115 of the respective chargers 70a, 70b, 70c in two stages. In a first stage, the pair of guide rails 160 cooperates with corresponding first guide members of the battery pack 200. This avoids a battery pack having a different connection structure from engaging with the charger 70. In a second stage, which occurs during approximately the latter portion of travel of the battery pack 200 relative to the charger housing 110, the guide rails 138 cooperate with corresponding second guide rails of the battery pack 200. This permits the housing 110 and the battery pack 200 to be in a tight fit. In addition, this cooperation precisely aligns the plurality of terminal blades 122 with corresponding plurality of terminal slots of the battery pack 200.

Top and bottom edges, in a longitudinal direction of the charging plate 55, include a cord wrap channel device 167. The cord wrap channel device 167 may be integrally molded with the charging plate 55. In some implementations, the cord wrap channel device 167 may be generally composed of the same material as the charging plate 55. For example, the cord wrap channel device 167 and the charging plate 55 may be formed from a plastic material, including, but not limited to, polyethylene, polypropylene, and/or polyurethane. The cord wrap channel device 167 permits an electrical cord (not shown) to be wrapped around the charging plate 55 in a tight untangled manner. In some implementations, the cord wrap channel device 167 may be formed in a semi-tubular shape to hold the electrical cord in place.

A side of the charging plate 55 includes a cord retention device 174 to hold an end of an electric cord in place. In the illustrated exemplary embodiment, the cord retention device 174 may be located on a left hand side of the charging plate 55. In some implementations, the cord retention device 174 may be formed on both sides of the charging plate 55. Once the electrical cord is completely wrapped around in the cord wrap channel device 167, the electric cord near the electric plug is inserted into the cord retention device 174 to securely hold the electric plug. The cord retention device 174 may be integrally molded with the charging plate 55. In some implementations, the cord retention device 174 may be generally composed of the same material as the charging plate 55. For example, the cord retention device 174 and the charging plate 55 may be form from a plastic material, including, but not limited to, polyethylene, polypropylene, and/or polyurethane.

The bottom edge of the charging plate 55 includes a plurality of protrusion members 171 extending in a perpendicular direction away from a surface of the charging plate 55 to stabilize the storage case 10 from tipping over. In other words, the plurality of protrusion members 171 may act as a counterweight to balance the storage case 10. In the illustrated exemplary embodiment, there are six protrusion members 171 at the bottom edge of the charging plate 55. It should be appreciated that more or fewer protrusion members 171 may be formed depending on an appropriate weight distribution. The protrusion members 171 may be integrally molded with the bottom cord wrap channel device 167 of the charging plate 55. In some implementations, the protrusion members 171 may be generally composed of the same material as the bottom cord wrap channel device 167 and/or the charging plate 55. For example, the protrusion members 171 and the bottom cord wrap channel device 167 and/or charging plate 55 may be form from a plastic material, including, but not limited to, polyethylene, polypropylene, and/or polyurethane.

Figure 4:
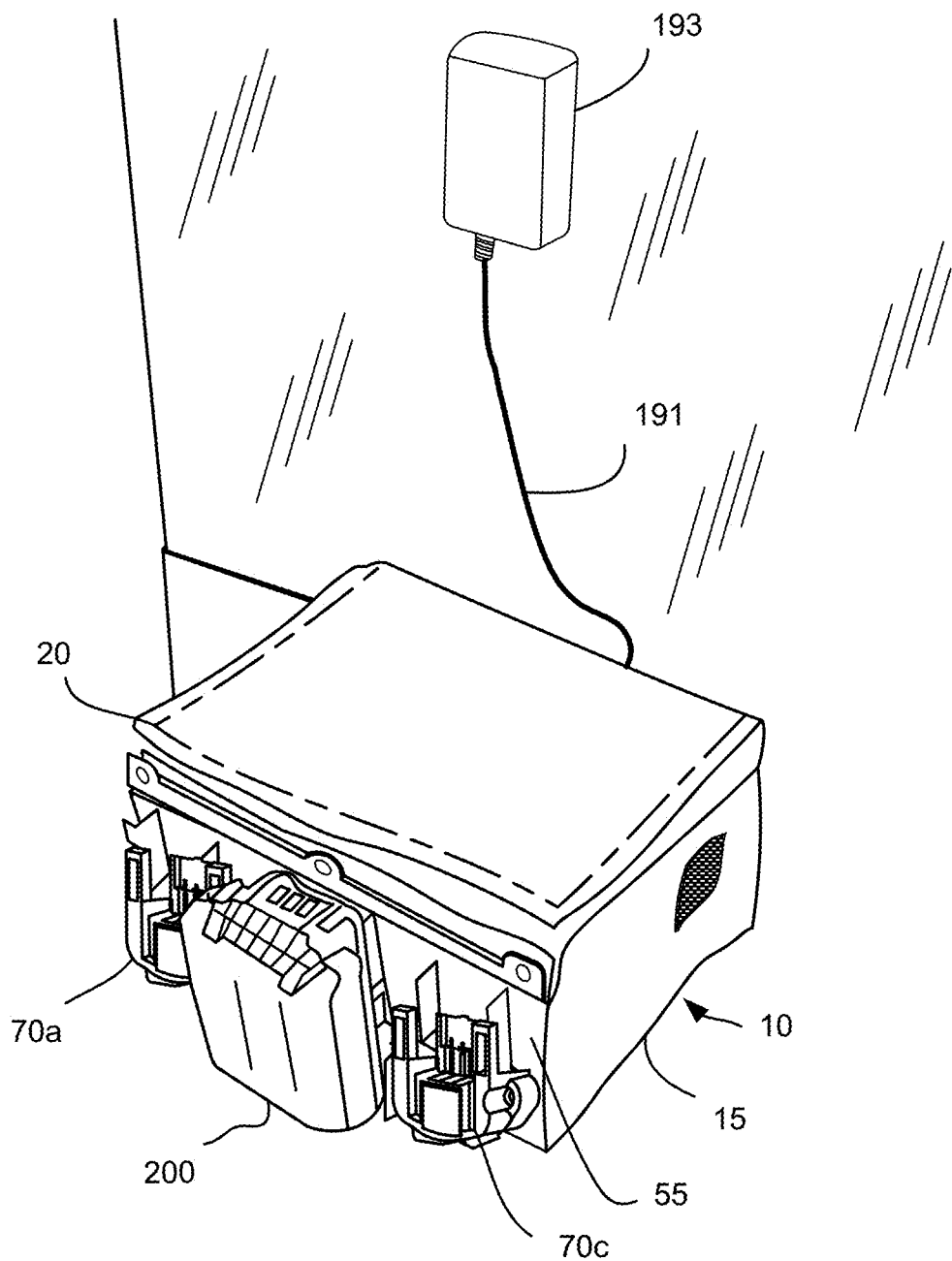
FIG. 4 is another perspective view of the battery pack charger system of FIG. 1.

Referring to FIG. 4, the battery pack charger system 1 allows the battery pack(s) 200 to be charged outside of the storage case 10 while the storage case 10 is closed via one of the chargers 70a, 70b, 70c. The battery pack charger system 1 may include a single electrical cord 191 to deliver power to all of the chargers 70a, 70b, 70c. A single electrical cord 191 ensures that less equipment is needed to carry around, saves storage space, and/or provides a compact design. The electrical cord 191 may extend into the storage case 10 and extend out at a back wall of the storage case 10 to plug the electrical cord 191 to an AC wall outlet to receive power. At an end of the electrical cord 191 may be a power brick 193 having an electrical outlet plug to be plugged into the AC wall outlet. In some implementations, the electrical cord 191 may include merely an electric plug to be plugged directly into the AC wall outlet without the power brick.

While at a work site, the user may insert a battery pack 200 into each of the respective chargers 70a, 70b, 70c, plug the battery pack charger system 1 into the electrical outlet, close the lid 24, and continue to work without waiting. For example, before a fully charged battery pack 200 attached to a power tool in use is used up, the user may insert a battery pack 200 into each of the respective chargers 70a, 70b, 70c to charge the battery pack 200. This provides a continuous supply of charged battery packs 200 at the work site. Further, if no electrical outlet is found at the work site, there is sufficient supply of charged battery packs 200 stored in the storage case 10 to continue work.

Moreover, since the chargers 70a, 70b, 70c are located outside of the storage case 10, the user is able to access a fully charged battery pack(s) 200 without having to open the storage case 10, pull out the battery charger, and then repack the storage case 10 and/or battery charger when the battery pack(s) 200 is finished charging. In addition, the storage case 10 may be transported to another location, such as, to a different work site or the user's home, for storage.

Figure 5:
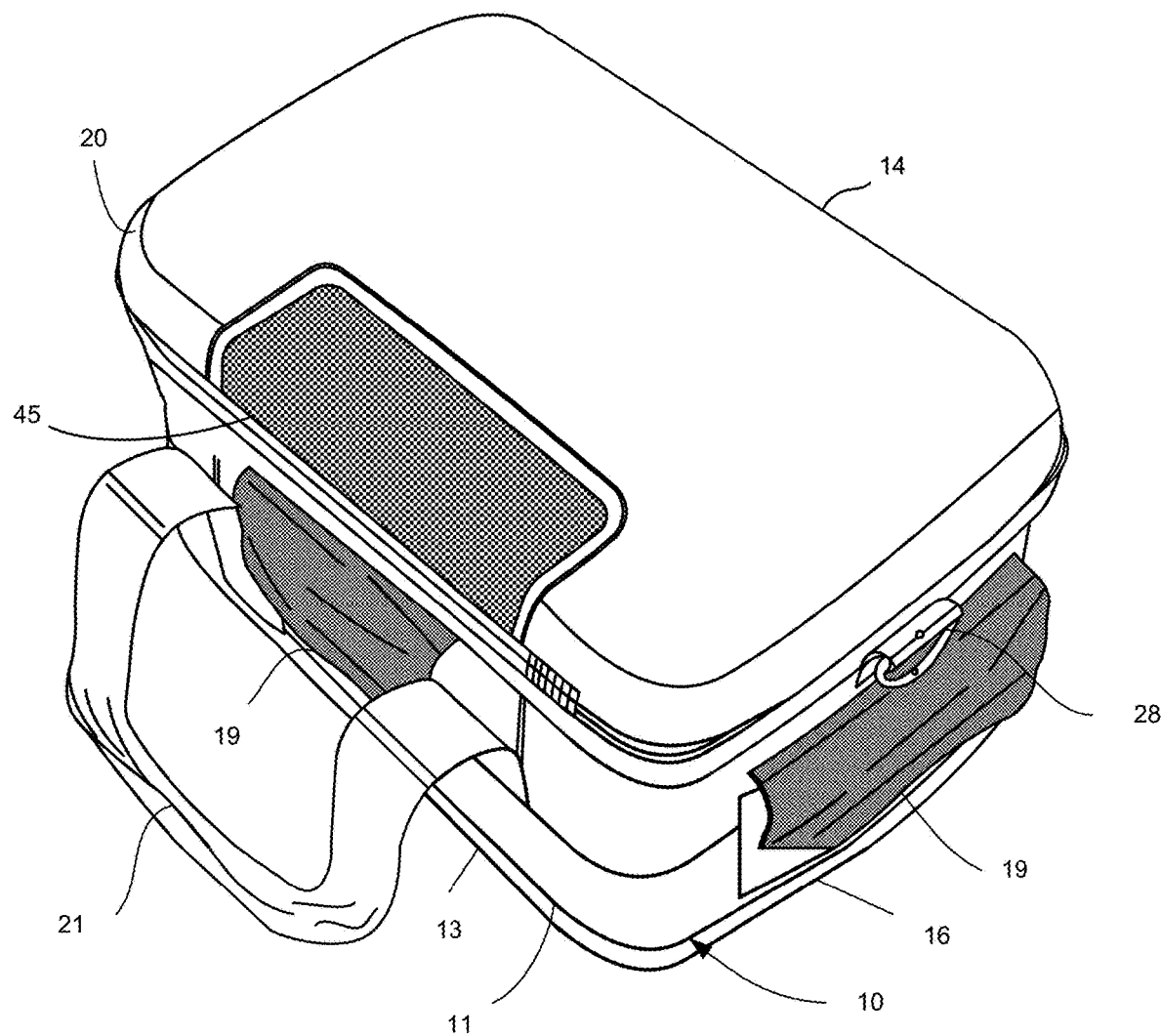
FIG. 5 is a perspective view of a battery pack charger system in accordance with another example embodiment.
Figure 6:
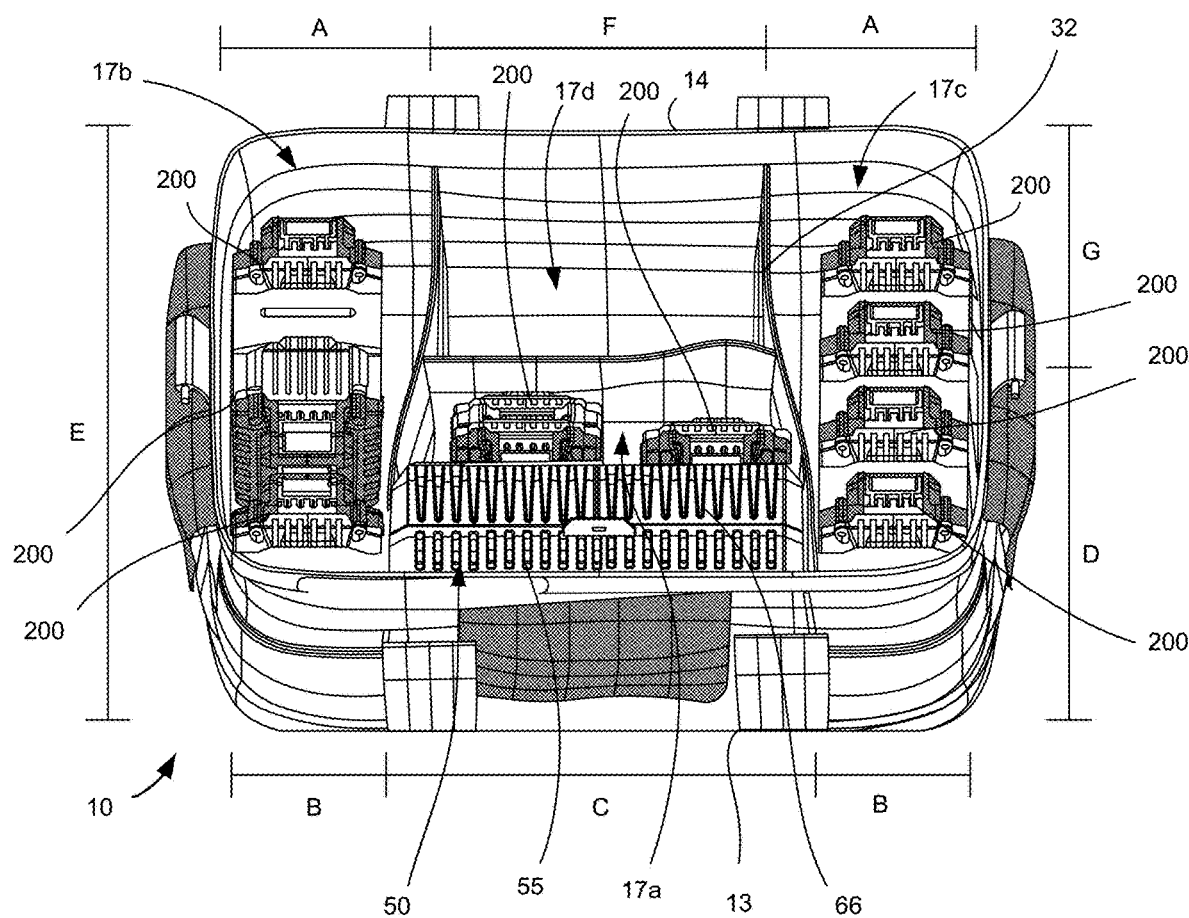
FIG. 6 is a perspective view of the inside of the battery pack charger system of FIG. 5.
Figure 7:
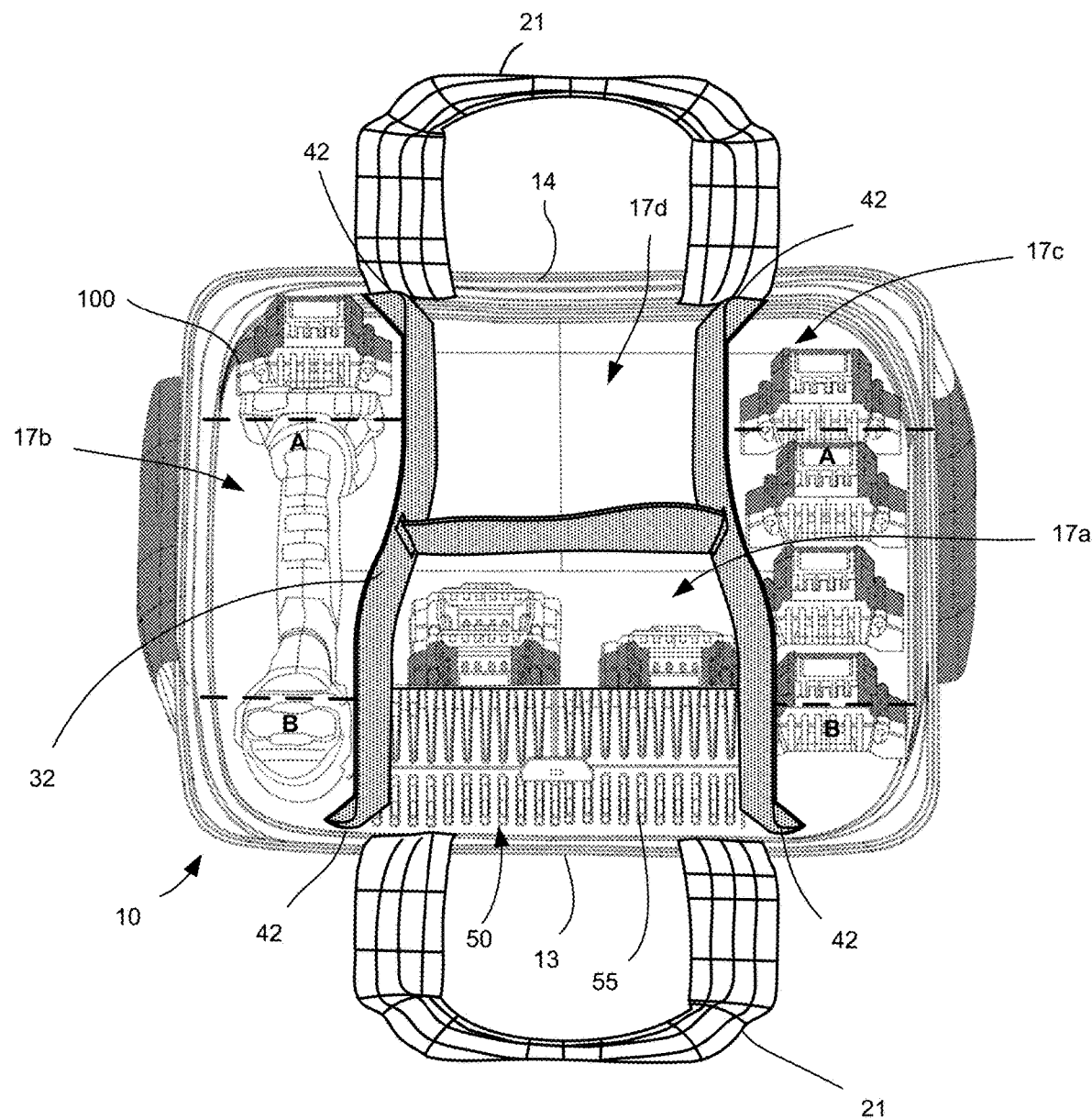
FIG. 7 is a plan view of the inside of the battery pack charger system of FIG. 5.

FIGS. 5 through 7 illustrate a battery pack charger system 5 in accordance with another example embodiment. Referring to FIG. 5, the battery pack charger system 5 may include a storage case 10 including a lid 20 which is in a closed position. The storage case 10 may be constructed with an outer casing 11 and an inner casing 12. The outer and inner casings 11, 12 can be constructed from a material sufficient to provide strength to withstand force (e.g., drops, impact from objects, etc.) and durability (e.g., weather). For example, the outer and inner casings 11, 12 may be constructed from a plastic material, such as, polyethylene, polypropylene, and/or polyurethane. Other materials, for example, nylon, canvas, vinyl, metal, wood, and/or any other suitable material may be used. In some implementations, the storage case 10 may be multi-layered to strengthen the structure of the storage case 10. For example, the storage case 10 may include materials such as foam, plastic, sponge, and/or cork between the outer and inner casings 11, 12.

In some implementations, the storage case 10 may include flaps 19 to further protect the storage case 10. The flaps 19 may be located at a front side 13 and sides 16 on an exterior surface of the storage case 10. Although not shown, a flap can also be located at a back side 14 of the storage case 10.

In some implementations, a handle 21 may be attached to the storage case 10 to allow a user to carry the storage case 10. For example, the handle 21 may be attached at a front side 13 of the storage case 10. Referring to FIG. 7, another handle 21 may be attached at a back side 14 of the storage case 10 to compensate for weight distribution while carrying the storage case 10. The handle 21 may be constructed from nylon, canvas, plastic, vinyl, and/or any other suitable material.

In some implementations, attached at each side 16 of the storage case 10 may include a metal clasp 28 to support a strap (not shown) therethrough and to carry the storage case 10 over a shoulder of a user. The strap may be, for example, a single over the shoulder strap or a double strap.

The storage case 10 should be a suitable size to allow a user to carry the storage case 10 at least by hand. For example, an overall dimension of the storage case 10 may be approximately 430 mm in length, approximately 295 mm in width, and 255 mm in depth. The size of the storage case 10 should also be sufficient to carry numerous components, including but not limited to, power tools, battery packs, chargers, electrical cords, and/or hand tools within the storage case 10.

Referring to FIG. 6, the storage case 10 (without the lid 20 shown) may store various components inside thereof. In the illustrated exemplary embodiment, the storage case 10 may store a charger 50 and a plurality of battery packs 200.

The battery packs 200 may be the same style or types of battery packs usable with portable equipment, such as, for example, power tools. In some implementations, the battery pack(s) 200 may be a slide-on style battery pack and may have a voltage ranging from 9 volts to 24 volts, for example. In some implementations, the battery pack(s) 200 may be a large battery pack containing large amount of battery cells. For example, the battery pack(s) 200 may include ten battery cells that can store about 55 Watt-hours of energy. In other implementations, the battery pack(s) 200 may be a compact battery pack having half the number of battery cells. For example, the battery pack(s) 200 may include five battery cells that can store about 27 Watt-hours of energy. It should be appreciated that other types of battery packs containing different number of battery cells and/or stored energy may be stored in the illustrated storage case 10. In some implementations, other types of battery packs, such as, for example, a tower-style battery pack may be stored in the storage case 10. In some implementations, different brands of battery packs may be stored in the storage case 10.

As shown in FIG. 6, the charger 50 may be located at an inner front side 13 of the storage case 10. The charger 50 may include a housing 55 that may support a charging port (not shown) and enclose a charging circuit (not shown) therein. It should be appreciated that the charging port as employed in FIG. 6 is similar to the charging port 115 as described in FIG. 3, and will not be discussed further in detail herein. In some implementations, the charger 50 may include several charging ports to charge multiple battery packs 200. In the illustrated exemplary embodiment, the charger 50 may include two charging ports to charge two respective battery packs 200. In some implementations, the charger 50 may include more than two charging ports to charge more than two battery packs. The charging ports of the charger 50 may be positioned parallel in relation to a front surface of the storage case 10.

The charger 50 may be configured to charge any of a plurality of different types of batteries or battery packs. For example, the charger 50 may be capable of charging the battery packs 200 having nickel-metal hydride ("NiMH"), nickel-cadmium ("NiCad"), lithium-cobalt ("Li—Co"), lithium-manganese ("Li-Ion"), Li—Mn spinel, or other suitable lithium or lithium-based chemistries. In some implementations, the charger 50 may make a determination of the type of battery pack based on, for example, a terminal voltage. In other implementations, the charger 50 may receive information or a signal from the battery pack 200 which indicates a battery pack type.

The charger 50 may also be configured to receive and charge battery packs 200 having any number of different voltage ratings, capacity ratings, configurations, shapes, and sizes. For example, the charger 50 may be operable to charge battery packs 200 having voltage ratings of 4V, 8V, 12V, 14.4V, 16V, 18V, 20V, 24V, 48V, etc., or battery packs having any voltage rating therebetween. The charger 50 may also be operable to charge battery packs 200 having individual cells with capacity ratings of 1.2 Ah, 1.3 Ah, 1.4 Ah, 2.0 Ah, 2.4 Ah, 2.6 Ah, 3.0 Ah, etc. The individual cell capacity ratings are combined to produce a total battery pack capacity rating, which is based both on the capacity ratings of the individual cells, the number of cells in each battery pack 200, and the manner in which the cells are coupled to each other.

The housing 55 may further include a plurality of vents 66 to remove heat from the charger 50 collected inside of the housing 55. The vents 66 may be substantially parallel with respect to each other. In some implementations, vents 66 may be at sides of the housing 55.

Referring back to FIG. 5, the lid 20 may contain a vent window 45 corresponding to an area where the charger 50 is located inside of the storage case 10. In other words, when the lid 20 is closed, the charger 50 is directly underneath the vent window 45. As a result, the vent window 45 helps transfer heat from the charger 50 (via the vents 66) out to the outside of the storage case 10 when the lid 20 is closed. In some implementations, the vent window 45 may be construed from a mesh material.

Figure 8:
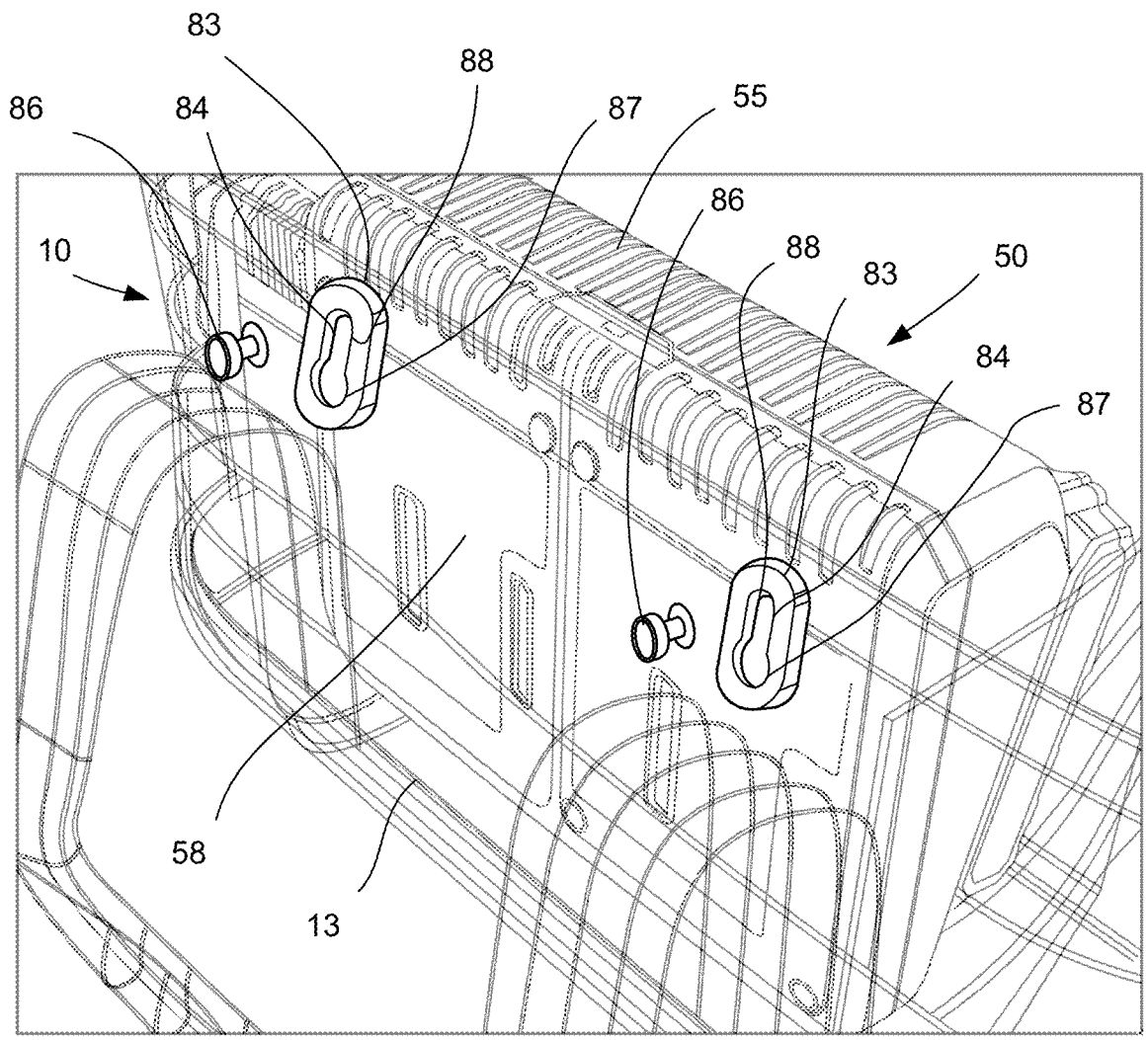
FIG. 8 is a perspective view of a connecting structure of the battery pack charger system of FIG. 5.

Referring to FIG. 8, on a back surface 58 of the housing 55, the charger 50 may include a mounting device 83 to attach the charger 50 to the inner front side 13 of the storage case 10. The mounting device 83 may be integrally molded to the back surface 58 of the housing 55 of the charger 50. In some implementations, the mounting device 83 may be securely attached to the housing 55 using other methods, such as, for example, mechanical fastening, adhesive bonding, plastic welding, welding, etc.

The mounting device 83 may include an opening 84. The opening 84 may include a first opening 87 on a lower portion of the opening 84 and a second opening 88 on an upper portion of the opening 84. The first opening 87 may be larger than the second opening 88. In order to attach the charger 50 to the storage case 10, a rivet 86 may be used, which extends from the front side 13 to an exterior space of the storage case 10. The rivet 86 may be inserted into the first opening 87 and slid upwardly to the second opening 88 for secure fit. One end of the rivet 86 may be exposed to the outside of the storage case 10 while the other end of the rivet 86 is securely fitted within the opening 84 of the mounting device 83. In some implementations, the rivet 86 may be constructed from a metal material, such as, for example, stainless steel.

In the illustrated exemplary embodiment, there may be two mounting devices 83 located on the back surface 58 of the housing 55. In some implementations, two or more mounting devices 83 may be employed to attach the charger 50 to the inner front surface 13 of the storage case 10.

Referring back to FIG. 6, the storage case 10 may include a partition member 32 configured to form a plurality of compartments 17a, 17b, 17c, 17d. In the illustrated exemplary embodiment, compartment 17a may house and store the charger 50, compartments 17b and 17c may house and store battery pack(s) 200, and compartment 17d may house and store other devices (e.g., power tool, additional battery packs, other tools, cords, etc.). There may be more or fewer compartments depending on the desired number of devices to be housed and stored in the storage case 10. In some implementations, compartment 17a may have a width of approximately 240 mm (designated as "C") and a height of approximately 190 mm (designated as "D"), compartments 17b and 17c may have a width of approximately 100 mm (designated as "A") at a top edge near the back side 14 and a width of approximately 80 mm (designated as "B") at a bottom edge near the front side 13 and a height of approximately 295 mm (designated as "E"), and compartment 17d may have a width of approximately 200 mm (designated as "F") and a height of approximately 105 mm (designated as "G").

Referring to FIG. 7, the width (designated as "A") at compartments 17b and 17c near the back side 14 of the storage case 10 may be wider than the width (designated as "B") near the front side 13 in order to ensure that a foot of the power tool 100 and the battery pack attached to the power tool clear the partition member 32. In other words, there should be enough clearance so that the power tool and the battery pack may be placed in compartments 17b or 17c without the partition member 32 interfering.

The partition member 32 may be in different configuration to form different shapes. For example, as illustrated herein, the partition member 32 may be in a generally H-shape. The H-shape may create sufficient spacing for all tools and/or battery packs to be housed in the storage case 10. In some implementations, the partition member 32 may be constructed from plastic, metal, wood, or any other suitable material.

In some implementations, the partition member 32 may be attachable/detachable from the storage case 10. The partition member 32 may be attachable and detachable at location 42 (shown in FIG. 7) using fasteners, such as, for example, hook and look fasteners. In other implementations, fasteners, such as, for example, snaps, zippers, and/or magnets, may be used to attach the partition member 32 to the storage case 10.

In some implementations, the compartments 17a, 17b, 17c, 17d may be divided in accordance with a type (condition) of battery packs 200. For example, compartment 17b and compartment 17c may be employed to store fully charged battery packs 200 and compartment 17d may be employed to store used battery packs 200. In some implementations, compartments 17a, 17b, 17c, 17d may be labeled for identifying the type of battery packs 200. For example, compartments 17b and 17c may be lined with a first color (e.g., green) to identify battery packs 200 that are stored therein (or to be placed therein) as fully charged, and compartment 17d may be lined with a second color (e.g., red) to identify battery packs 200 that are stored therein (or to be placed therein) as used. In some implementations, compartments 17b, 17c, 17d may be identified using labels (e.g., "used" and "charged").

In some implementations, the compartments 17a, 17b, 17c, 17d may have a lining to protect the devices inside. For example, the compartments 17a, 17b, 17c, 17d may be lined with felt, fleece, foam, sponge, cork, or some other material to protect the devices.

In some implementations, the compartments 17a, 17b, 17c, 17d may be thermally insulated to control a temperature inside of the housing 15. For example, the compartments 17a, 17b, 17c, 17d may be lined with fiberglass, mineral wool, cellulose, polyurethane foam, polystyrene, cork, or some other material to thermally insulate the devices within the storage case 10.

Figure 9:
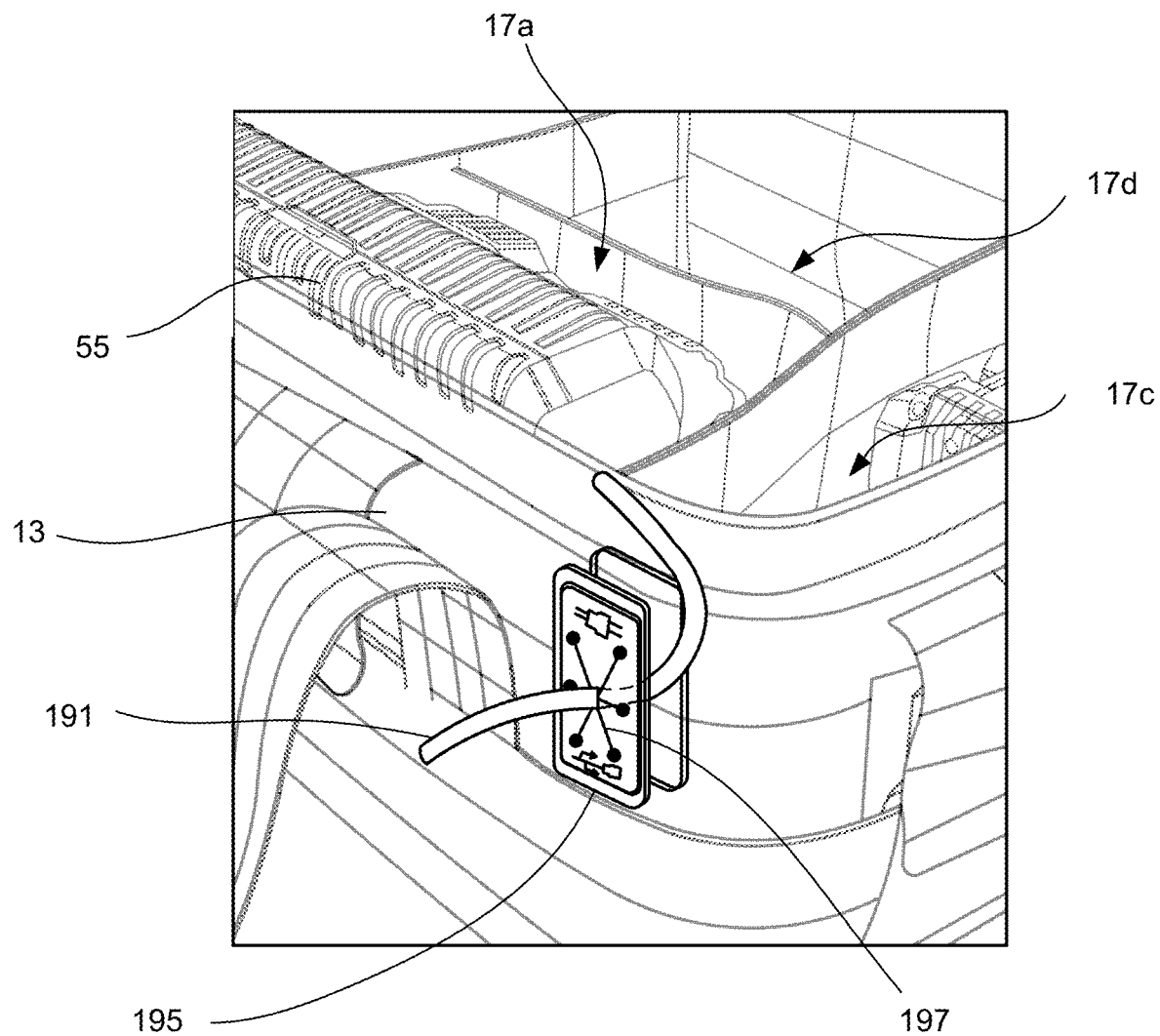
FIG. 9 is a perspective view of an electrical cord cut-out of the battery pack charger system of FIG. 5.

Referring to FIG. 9, a cord cut-out portion 195 may be formed on a surface of the storage case 10 so that an electrical cord 191 associated with the charger 50 may extend out from the storage case 10, and plug into a wall outlet to deliver power to the charger 50. The cord cut-out portion 195 should be sufficient to provide an opening to enable the electrical cord 191 including an electric plug (not shown) to exit out from the storage case 10. In some implementations, the cord cut-out portion 195 may be formed at the front side 13 on an exterior surface of the storage case 10. For example, the cord cut-out portion 195 may be located at the front side 13 near compartment 17c. In other implementations, the cord cut-out portion 195 may be located at the front side 13 near compartment 17b (opposite end of compartment 17c). In other implementations, the cord cut-out portion 195 may be located at both ends of the front side 13 near compartment 17b and compartment 17c. The cord cut-out portion 195 should be as close as possible to the charger 50 so that the electrical cord 191 does not tangle itself against the charger 50.

In some implementations, the cord cut-out portion 195 may be constructed from an elastic material. For example, the cord cut-out portion 195 may be made from rubber. In some implementations, the cord cut-out portion 195 may include slits 197. In an exemplary embodiment as illustrated, three slits 197 intersect with each other to form the cord cut-out portion 195. The intersecting slits 197 may form a star-like configuration. In other words, the intersecting slits 197 may create six flaps, in which the six flaps may converge at a central point. Each of the flaps may bend back and forth due to its elasticity of material. In use, when the electric plug extends out from the cord cut-portion portion 195, the flaps bend outwardly (away from the storage case 10) until an entire electric plug extends out from the storage case 10, and then bend back to their original position with only the electric cord 191 extending out from the cord cut-out portion 195. The elasticity of the flaps creates sufficient grasp of the electric cord 191 to hold the electric cord 191 in place.

Figure 10:
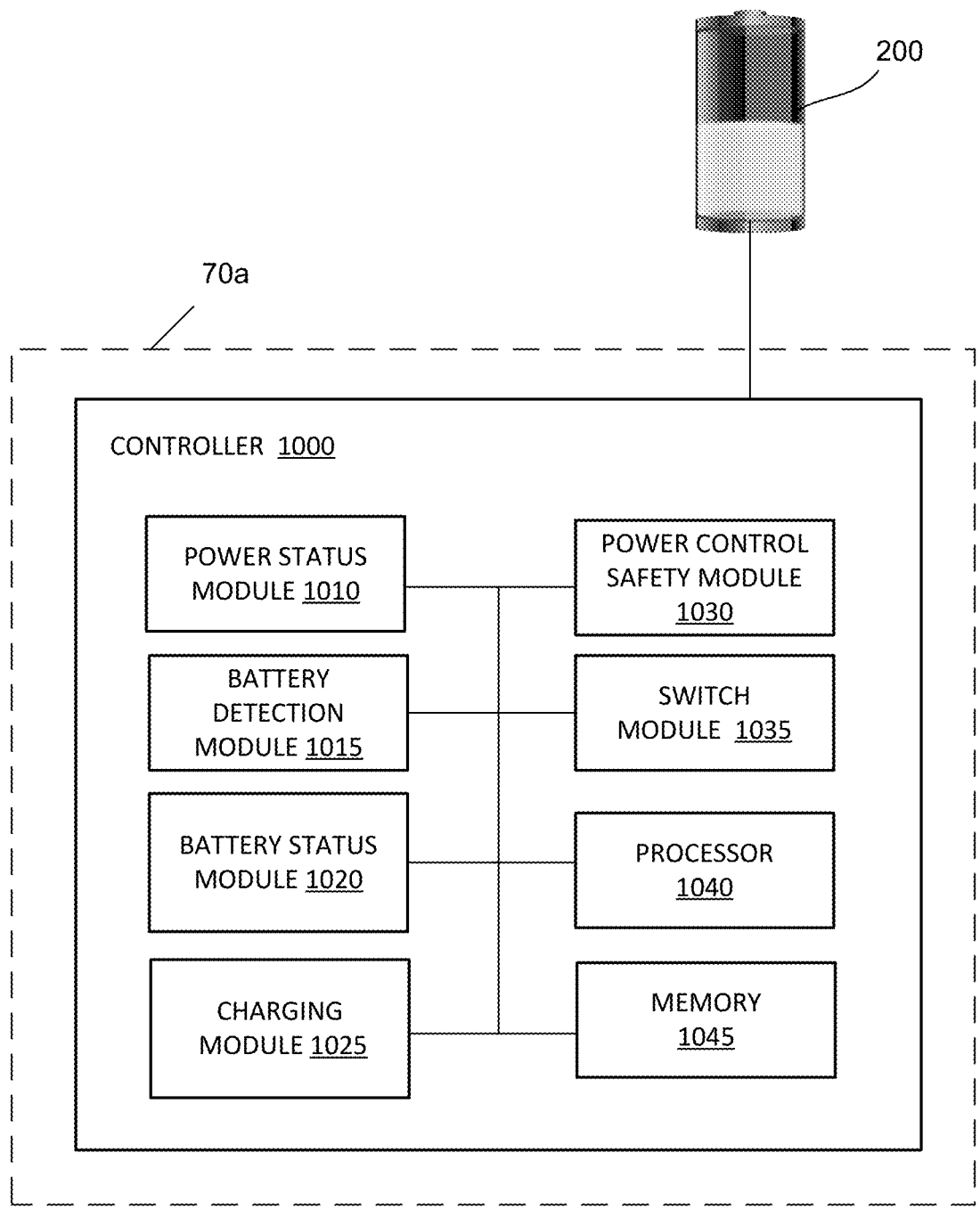
FIG. 10 is a schematic block diagram of a controller of a charger according to an example embodiment.

FIG. 10 is a schematic block diagram of a controller (control circuit) 1000 of a charger according to at least one example embodiment. The controller 1000 may be incorporated as part of a charging circuit (not shown) housed in each of the chargers 70a, 70b, 70c of the battery pack charger system 1, as described in FIGS. 1-4. It should be appreciated that the controller 1000 may also be used for the battery pack charger system 5, as described in FIGS. 5-7, as long as the same number of chargers are employed. It should further be appreciated that each chargers 70a, 70b, 70c may be the same (or substantially identical) and therefore, the components and/or elements described for the one charger may be used to describe the other chargers.

The controller 1000 may be configured to receive information or data associated with detection of the battery pack(s) 200, receiving power associated with the charger and a status and/or charge of the battery pack(s) 200. The information or data relating to detection can include an identification of battery (i.e., type of battery) and/or detection of battery in the charging port 115 of the respective chargers 70a, 70b, 70c.

The information or data relating to power can include a desired voltage, current and/or power setting, an over temperature protection threshold, an over voltage protection threshold, an over current protection threshold, a communication time interval and/or the like. The information or data relating to the status and/or charge of the battery pack 200 may include a battery capacity, a charge amount, a charging power, a voltage, a current, a temperature, a charging status (e.g., full/charging), an error(s) associated with charging the battery pack 200 and/or the like. The controller 1000 may be configured to use the desired voltage, current and/or power setting, the over temperature protection threshold, the over voltage protection threshold, the over current protection threshold, the communication time interval and/or the like to modify voltage, current and/or power settings of the charger. The controller 1000 may be configured to use the status of and/or charge of the battery pack 200 to modify voltage, current and/or power settings of the charger.

In some implementations, the controller 1000 may be configured to generate signals to protect the charger should an error (e.g., over current and/or high temperature) be indicated by the status and/or charge of the battery pack 200. For example, the controller 1000 may be configured to disconnect or cause the charger to stop (or reduce) transferring DC power should an error condition be indicated by the status and/or charge of the battery pack 200. The controller 1000 may also be configured to disconnect or cause the charger to stop transferring DC power should the status and/or charge of the battery pack 200 indicate that the battery pack 200 is fully charged.

In some implementations, the controller 1000 may be configured to receive signals from a power module of the charger. The signals may indicate at least one of a power, a voltage and a current associated with the charger. The controller 1000 may be configured to disconnect or cause the power module to stop (or reduce) transferring DC power should at least one of the power, the voltage and the current associated with the power module exceed a threshold value. The controller 1000 may also be configured to disconnect or cause the power module to stop (or reduce) transferring DC power should other signals associated with the charger indicate a parameter exceeds a threshold value.

In some implementations, the desired voltage, current and/or power setting may be based on a charging mode. For example, a fast charging mode may be based on a high (e.g., higher than normal) voltage and/or current. The controller 1000 may change the threshold of the charger protection limit, and control how much power the charger needs to avoid over current and/or draw maximum power from the charger.

The controller 1000 may be configured to monitor a status of the battery pack(s) 200. For example, the controller 1000 may measure a voltage, a current, a temperature and the like of the battery pack(s) 200. The controller 1000 may be configured to monitor a charging status of the battery pack(s) 200. For example, the controller 1000 may monitor whether or not the battery pack(s) 200 is/are fully charged or charging.

In some implementations, once the controller 1000 determines that the battery pack 200 is fully charged, the controller 1000 may direct power to charge other battery pack(s) 200. In other words, the controller 1000 may be configured to sequentially charge the battery packs 200. In some implementations, the controller 1000 may simultaneously charge the battery packs 200.

Referring to FIG. 10, the controller 1000 in each of the chargers 70a, 70b, 70c may include a power status module 1010, a battery detection module 1015, a battery status module 1020, a charging module 1025, a power control safety module 1030, a switch module 1035, a processor 1040, and a memory 1045.

The power status module 1010 may be configured to receive information related to the powering of the charger. For example, the information may include at least one voltage, at least one current and/or at least one power associated with the charger.

The battery detection module 1015 may be configured to detect the presence of the battery pack 200 in each charging port 115 of the respective chargers 70a, 70b, 70c, and select the respective charging port 115 for charging.

The battery status module 1020 may be configured to receive information related to the battery pack 200 status and/or charge status of the battery pack 200. The information related to the status and/or charge status of battery pack 200 may include a battery capacity, a charge amount, a time to full charge, a charging power, a charging status (e.g., full/charging), an error(s) associated with charging the battery and/or the like. In some implementations, the battery status module 1020 may generate indicators based on the information related to the status and/or charge status of the battery pack 200.

The charging module 1025 may be configured to monitor a charging status of the battery pack 200. For example, the charging module 1025 may monitor whether or not the battery pack(s) 200 is/are fully charged or charging. The charging module 1025 may further be configured to determine a type of charge required by the battery pack 200. For example, the controller 1000 may determine whether the battery pack 200 requires a fast charge or a slow charge. In some implementations, the desired voltage, current and/or power setting may be based on a charging mode. For example, a fast charging mode may be based on a high (e.g., higher than normal) voltage and/or current. The controller 1000 may change the threshold of the charger protection limit, and control how much power the charger needs to avoid over current and/or draw maximum power from the charger.

The power control safety module 1030 may be configured to receive measurable data (e.g., temperature, current, voltage, power) regarding the charger and/or the battery pack 200 and determine if at least one of the measurable data exceeds a threshold value. If at least one of the measurable data exceeds a threshold value, the power control safety module 1030 may be configured to output an error status, and disconnect or cause the charger to stop (or reduce) transferring DC power.

The switch module 1035 may be configured to switch powering to a second and/or a third charger (e.g., 70b and/or 70c) once the battery pack 200 in one charger (e.g., 70a) is fully charged. In some implementations, once the battery status module 1020 indicates that the battery pack 200 in one of the chargers is fully charged, the switch module 1035 may direct power to charge the battery pack 200 in the second and/or third charger. In other words, the switch module 1035 may be configured to sequentially charge the battery pack 200 in a first of the chargers and then the battery pack 200 in a second of the chargers. In some implementations, the switch module 1035 may cause a charge to be supplied to both of the battery packs in the respective chargers. In other words, switch module 1035 may be configured to simultaneously charge the battery packs 200 in the plurality of chargers.

The processor 1040 may be configured to execute instructions. For example, processor 1040 can be associated with any of the components of the controller 1000, and can be used for execution of any of the operations of the controller 1000. The memory 1045 may be configured to store instructions (e.g., as code segments) and/or data associated with implementing functions associated with the controller 1000 and/or the charger. In some implementations, the memory 1045 may store threshold values to operate the power control safety module 1030. For example, the threshold values may include an over temperature protection threshold, an over voltage protection threshold, an over current protection threshold and/or the like. In some implementations, the threshold values may include default threshold values and a protection value of the battery pack 200. For example, the power control safety module 1030 may be configured to read and use the protection value(s) of the battery pack 200. In some implementations, the threshold values may include resetting the protection value(s) of the charger to the default threshold values. For example, the power control safety module 1030 may be configured to reset the protection value(s) of the charger to the default threshold values. For another example, the power control safety module 1030 may be configured to reset the protection value(s) of the charger to the default threshold values upon determining the battery pack 200 has been disconnected from the charger. In some implementations, the memory 1045 may store battery historical charge and/or recondition/recalibration data.

As may be appreciated, the processor 1040 may be formed on a substrate and may be utilized to execute instructions stored on the memory 1045, so as to thereby implement the various features and functions described herein, or additional or alternative features and functions. Of course, the processor 1040 and the memory 1045 may be utilized for various other purposes. In particular, it may be appreciated that the memory 1045 may be understood to represent an example of various types of memory and related hardware and software which might be used to implement any one of the modules described herein. Systems and/or methods described above and/or below may include data and/or storage elements. The data and/or storage elements (e.g., database tables) may be stored in, for example, the memory 1045.

The memory 1045 may store information within one of the chargers. In one implementation, the memory 1045 may be a volatile memory unit or units. In another implementation, the memory 1045 may be a non-volatile memory unit or units. The memory 1045 may also be another form of computer-readable medium, such as a magnetic or optical disk. The memory 1045 may be a non-transitory computer readable medium.

FIGS. 11-14 are flowcharts of methods of charging the battery packs 200 according to example embodiments. The steps described with regard to FIGS. 11-14 may be performed due to the execution of software code stored in the memory 1045 associated with the respective charger (e.g., 70a, 70b 70c) and executed by the processor 1040 associated with the respective charger (e.g., 70a, 70b 70c). However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 11-14.

Figure 11:
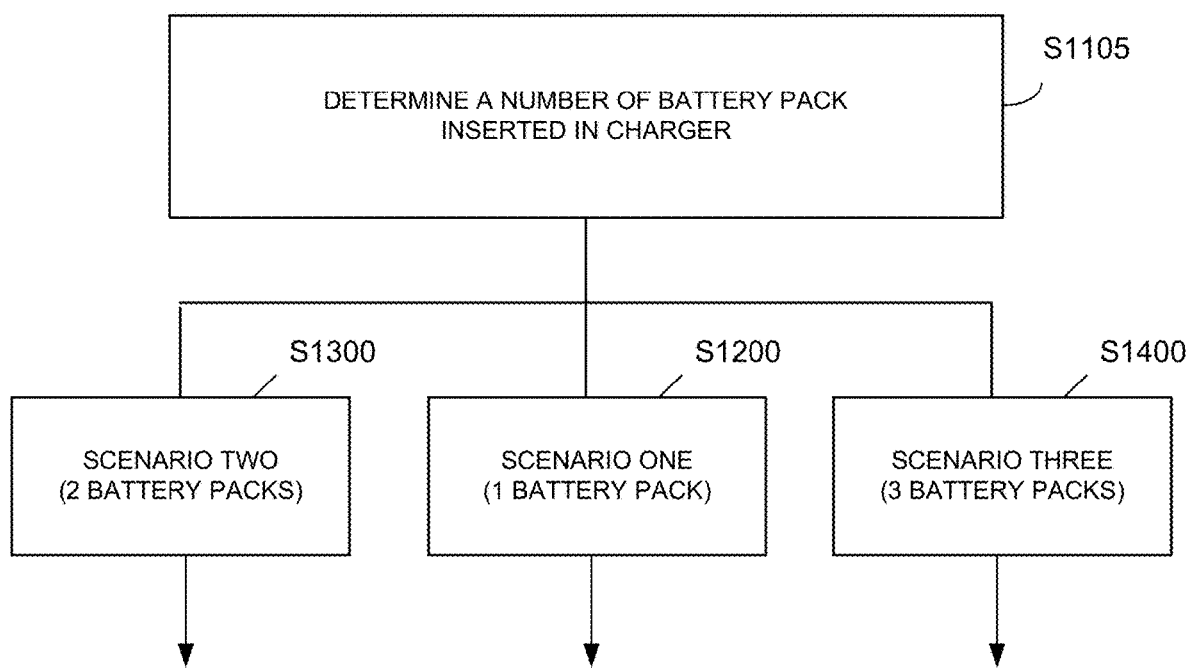
FIG. 11 is a flowchart of a method of charging a battery pack according to an example embodiment.

Referring to FIG. 11, the controller 1000 may be configured to execute a charging control process using corresponding circuitry which determines, among other things, a type of charge required by the battery pack(s) 200. In step S1105 the controller 1000 may detect a presence of the battery pack 200 in each respective chargers 70a, 70b, 70c, and may select the respective chargers 70a, 70b, 70c for charging. For example, if only one battery pack 200 is inserted in one of the respective chargers 70a, 70b, 70c, the controller 1000 proceeds to step S1200. If two battery packs 200 are inserted in the respective chargers 70a, 70b, 70c, the controller 1000 proceeds to step S1300. If three battery packs 200 are inserted in the respective chargers 70a, 70b, 70c, the controller 1000 proceeds to step S1400.

Figure 12:
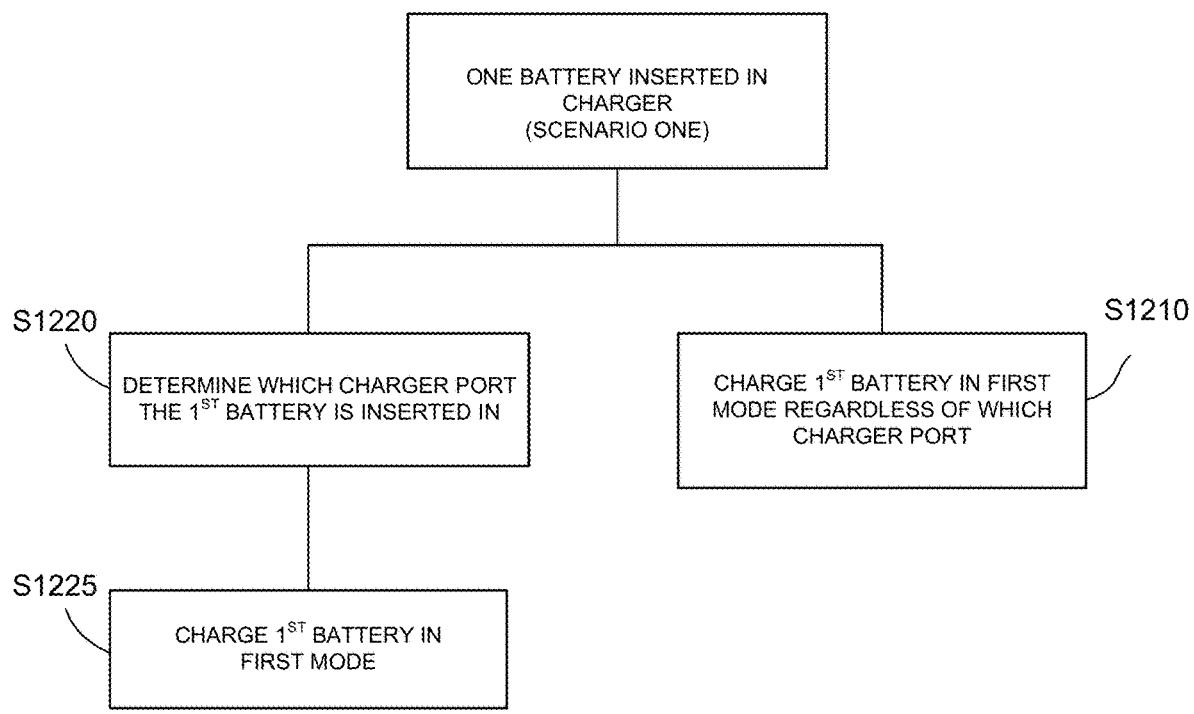
FIG. 12 is a flowchart of one of the options of the method of FIG. 11.

Referring to FIG. 12, when only one battery pack 200 is inserted in the charger port 115 of one of the respective chargers 70a, 70b, 70c, the controller 1000 may be configured to charge the battery pack 200 in a fast charging mode (e.g., a charge from 0% capacity to 95% capacity) regardless of which charging port 115 the battery pack 200 is inserted into (step S1210).

In an alternative implementation, one of the charger ports 115 may be dedicated as a fast charging mode and the other charging port(s) may not (i.e., dedicated as a slow charging mode). In step S1220, the controller 1000 may be configured to charge the battery pack 200 based on whether the battery pack 200 is inserted in a charging port 115 that is dedicated as a fast mode. For example, if charging port 115 of charger 70b is dedicated as the fast mode charging port, and the other chargers (e.g., 70a and 70c) are not, the battery pack 200 inserted in charger 70b will receive power in the fast mode (step S1225), while battery packs 200 inserted in chargers 70a and 70a will receive power in slow mode.

Figure 13:
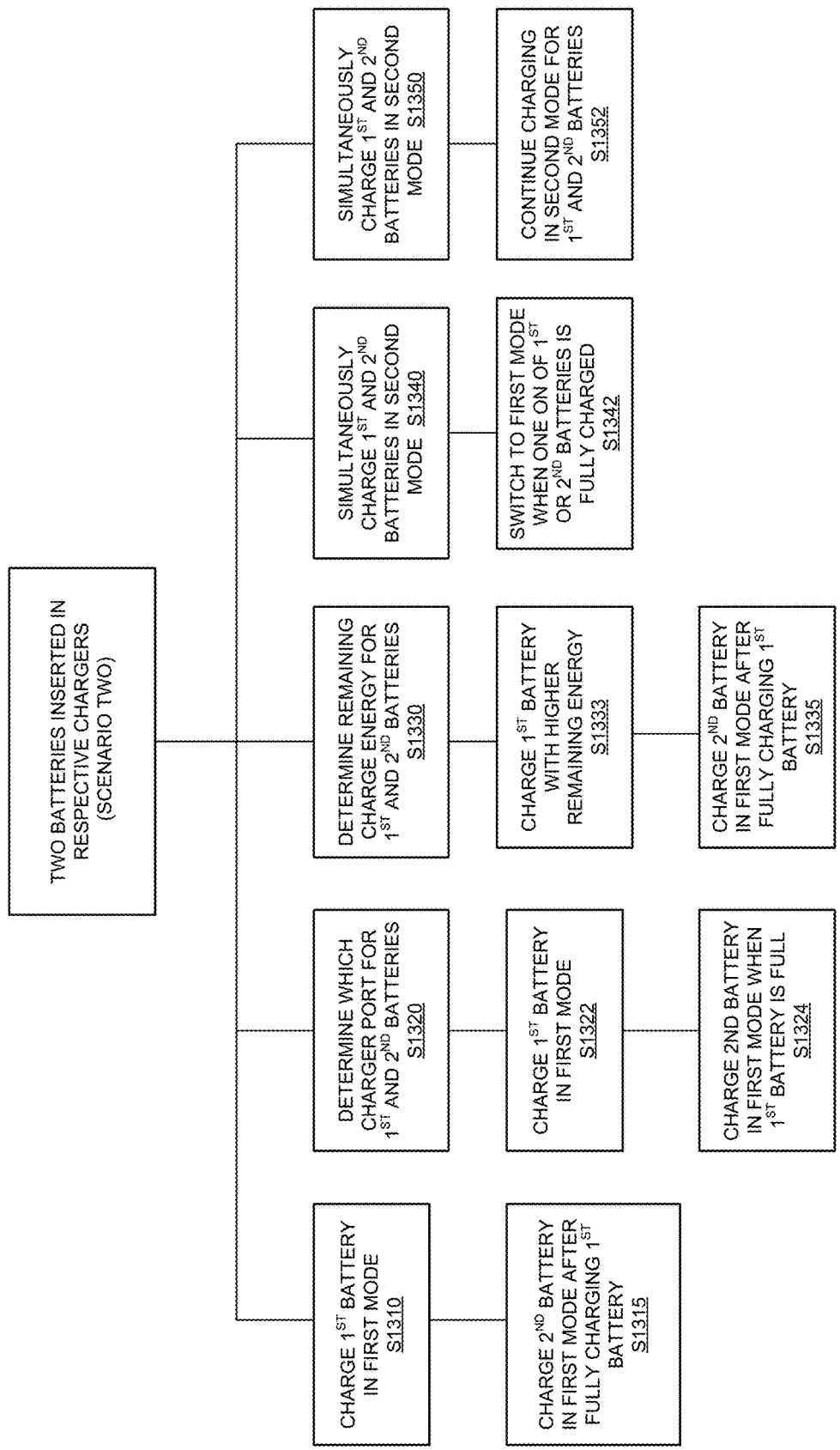
FIG. 13 is a flowchart of one of the options of the method of FIG. 11.

Referring to FIG. 13, when only two battery packs 200 are inserted in the respective charger port 115 of chargers 70a, 70b or 70c, the controller 1000 may be configured to charge the battery packs 200 in accordance with various implementations.

In some implementations, in step S1310, the controller 1000 may sequentially charge the battery packs 200 in the order they were connected to the chargers. For example, the battery pack 200 inserted in charger 70a may be charged in the fast charging mode, and once completely charged, another battery pack 200 inserted in charger 70b is charged in the fast charging mode (step S1315). In alternative embodiments, the controller 1000 may cycle serially through the chargers 70*a*, 70*b*, 70*c* to determine parameters regarding the battery packs 200 that are inserted into each chargers 70*a*, 70*b*, 70*c*.

In some implementations, the controller 1000 may be configured to charge the two battery packs 200 in accordance with which charging port 115 the battery packs 200 are inserted thereto. In other words, the controller 1000 may determine whether one of the battery packs 200 is inserted in the charger port 115 that is dedicated as a fast charging port while the other charger port(s) 115 is not dedicated as a fast charging port (i.e., slow charging port(s)). In step S1320, the controller 1000 may be configured to charge the battery pack 200 based on whether the battery pack 200 is inserted in a charging port 115 that is dedicated in a fast mode. For example, if charging port 115 of charger 70*b* is dedicated as the fast mode charging port, the battery pack 200 inserted in charger 70*b* will first receive power in the fast mode (step S1322). Next, in step S1324, once the battery pack 200 inserted in charger 70*b* is fully charged, the controller 1000 proceeds to charge the other battery pack 200 inserted in charger 70*a* or 70*c* in the fast mode or a normal mode.

In some implementations, the controller 1000 may be configured to charge the two battery packs 200 in accordance to a charge energy remaining in the two battery packs 200 with respect to each other. In other words, the controller 1000 may charge the battery pack with a higher remaining energy (e.g., battery pack with less required charge) first and then charge the subsequent battery pack with the lower remaining energy. In step S1330, the controller 1000 may be configured to charge the battery pack 200 based on which battery pack 200 has a higher remaining energy. For example, if the battery pack 200 inserted in the charger 70*b* has 70% remaining energy stored therein and the battery pack 200 inserted in the charger 70*a* has 25% remaining energy stored therein, the battery pack inserted in the charger 70*b* will be charged first (step S1333) in the fast mode and then the battery pack 200 inserted in the charger 70*a* thereafter (step S1335) in the fast mode.

In some implementations, the controller 1000 may be configured to charge the two battery packs 200 simultaneously. For example, the controller 1000 may charge the two battery packs 200 at the same time in a "slow or split mode" (step S1340). Once one of the two battery packs 200 is fully charged, the controller 1000 will switch into the fast charging mode and charge the other of the two battery pack 200 to full charge (step S1342).

In another implementation, the controller 1000 may also be configured to charge the two battery packs 200 simultaneously. But in this exemplary implementation, the controller 1000 may charge the two battery packs 200 at the same time in a "slow or split mode" (step S1350). And then, once one of the two battery packs 200 is fully charged, the controller 1000 will continue to charge the other of the two battery packs 200 in the slow mode to fully charge (step S1352).

Figure 14:
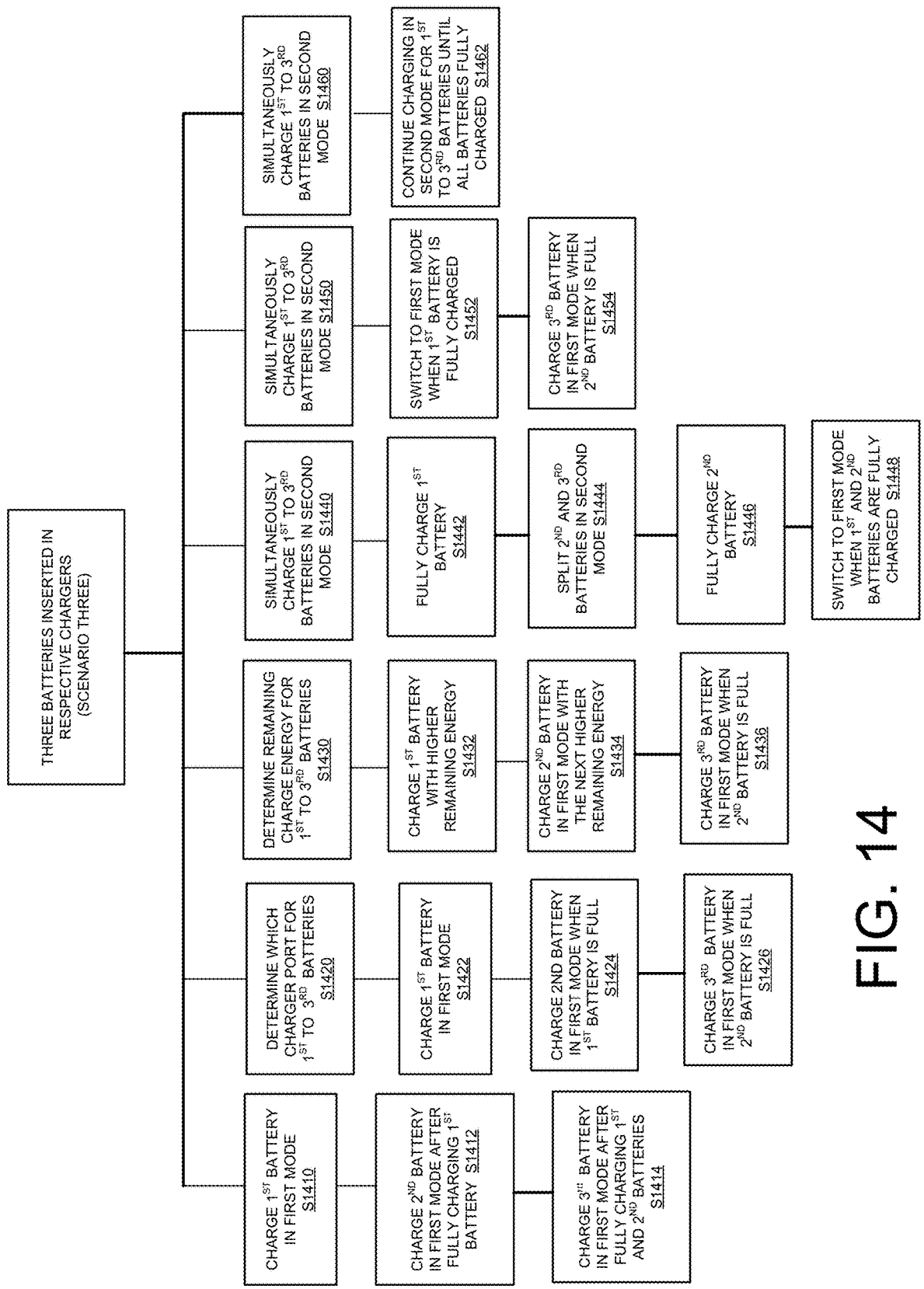
FIG. 14 is a flowchart of one of the options of the method of FIG. 11.

Referring to FIG. 14, when three battery packs 200 are inserted in the respective charger port 115 of chargers 70*a*, 70*b* 70*c*, the controller 1000 may be configured to charge the battery packs 200 in accordance to various implementations.

In some implementations, in step S1410, the controller 1000 may sequentially charge the battery packs 200 in the order they were connected to the chargers. For example, the battery pack 200 inserted in the first charger 70*a* may be charged in the fast charging mode, and once completely charged, a battery pack 200 inserted in the second charger 70*b* is charged in the fast charging mode (step S1412), and once completely charged, a battery pack 200 inserted in the third charger 70*c* is charged in the fast charging mode (step S1414). In alternative embodiments, the controller 1000 may cycle serially through the chargers 70*a*, 70*b*, 70*c* to determine parameters regarding the battery packs 200 that are inserted into each of the chargers 70*a*, 70*b*, 70*c*.

In some implementations, the controller 1000 may be configured to charge the three battery packs 200 in accordance to which charging port 115 the battery packs 200 are inserted thereto. In other words, the controller 1000 may determine whether one of the battery packs 200 is inserted in the charger port 115 that is dedicated as a fast charging port while the other charger port(s) 115 is not dedicated as a fast charging port (i.e., slow charging port(s)). In step S1420, the controller 1000 may be configured to charge the battery pack 200 based on whether the battery pack 200 is inserted in a charging port 115 that is dedicated in a fast mode. For example, if charging port 115 of the second charger 70*b* is dedicated as the fast mode charging port, the battery pack 200 inserted in the second charger 70*b* will first receive power in the fast mode (step S1422). Next, in step S1424, once the battery pack 200 inserted in the second charger 70*b* is fully charged, the controller 1000 proceeds to charge the battery pack 200 inserted in the first charger 70*a* in the fast mode. In step S1426, once the battery pack 200 inserted in the first charger 70*a* is fully charged, the controller 1000 proceeds to charge the battery pack 200 inserted in the third charger 70*c* in the fast mode.

In some implementations, the controller 1000 may be configured to charge the two battery packs 200 in accordance to a charge energy remaining in the two battery packs 200 with respect to each other. In other words, the controller 1000 may charge the battery pack with a higher remaining energy (e.g., battery pack with less required charge) first and then charge the battery pack with the lower remaining energy. In step S1430, the controller 1000 may be configured to charge the battery pack 200 based on which battery pack 200 has a higher remaining energy. For example, if the battery pack 200 inserted in the second charger 70*b* has 70% remaining energy stored therein and the battery pack 200 inserted in the first charger 70*a* has 50% remaining energy stored therein, and the battery pack 200 inserted in the third charger 70*c* has 25% remaining energy stored therein, the battery pack inserted in the second charger 70*b* will be charged first (step S1432) in the fast mode and then the battery pack 200 inserted in the first charger 70*a* will be charged in the fast mode (step S1434) and then the battery pack 200 inserted in the third charger 70*c* (step S1436) in the fast mode.

In some implementations, the controller 1000 may be configured to charge the three battery packs 200 simultaneously. For example, the controller 1000 may charge the three battery packs 200 at the same time in a "slow or split mode" (step S1440). Once one of the battery packs 200 is fully charged (S1442), the controller 1000 will continue to charge the other battery packs 200 in the slow or split mode (S1444) until one of the battery packs 200 is fully charged (S1446). Once the second of the three battery packs is fully charged, the controller 1000 may switch into the fast charging mode and charge the last battery pack 200 to full charge (step S1446).

In another implementation, the controller 1000 may be configured to charge the three battery packs 200 simultaneously. For example, the controller 1000 may charge the three battery packs 200 at the same time in a "slow or split mode" (step S1450). Once one of the battery packs 200 is fully charged (step S1452), the controller 1000 will switch to fast mode and charge the other battery packs 200 in the fast mode (S1454) until the last battery pack 200 is fully charged.

In another implementation, the controller 1000 may be configured to charge the three battery packs 200 simultaneously. For example, the controller 1000 may charge the three battery packs 200 at the same time in a "slow or split mode" (step S1360). Once one or two of the battery packs 200 is fully charged, the controller 1000 will continue to charge the subsequent battery pack 200 in the slow mode to fully charge the subsequent battery pack 200 (step S1362).

Example embodiments relate to a battery pack charger system designed to accommodate a slide-on style battery pack. While exemplary embodiments illustrated herein describe accommodating a slide-on style battery pack, the battery pack charger system may be used to charge other types of battery packs. For example, the battery pack charger system may charge a tower type battery packs. In some implementations, the battery pack charger system may charge different types of battery packs. For example, the one charger may charge a slide-on style battery pack and the other charger may charger a tower type battery pack.

The configurations, shapes, and sizes of the battery packs include but are not limited to configurations, shapes, and sizes of battery packs that are attachable to and detachable from electrical devices such as power tools, test and measurement equipment, vacuum cleaners, outdoor power equipment, and vehicles. Power tools include, for example, drills, circular saws, jigsaws, band saws, reciprocating saws, screw drivers, angle grinders, straight grinders, hammers, impact wrenches, angle drills, inspection cameras, and the like. Test and measurement equipment includes, for example, digital multimeters, clamp meters, fork meters, wall scanners, IR temperature guns, and the like. Vacuum cleaners include, for example, stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like. Vehicles include, for example, automobiles, motorcycles, scooters, bicycles, and the like.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
    a case configured to store and transport a plurality of battery packs, the case includes:
        a housing;
        a lid; and
    a charging system coupled to an exterior surface of the case, the charging system includes:
        a plate member, the plate member being detachably coupled from the case; and
        a plurality of chargers disposed on the plate member, the plurality of chargers arranged in parallel with respect to each other on the plate member, the plate member includes a plurality of protrusion members, the plurality of protrusion members extend from a surface of the plate member to stabilize and prevent the case from tipping.

2. The system of claim 1, wherein the plate member further includes a channel member configured to wrap an electrical cord around the plate member.

3. The system of claim 2, wherein a first part of the channel member is located at a top edge of the plate member and a second part of the channel member is located at a bottom edge of the plate member.

4. The system of claim 1, wherein the plate member further includes a cord retention member configured to hold an end of an electrical cord.

5. The system of claim 1, wherein the plate member includes a pair of guide members configured to engage corresponding guide rails of a slide-on style battery pack, the pair of guide members located above each of the plurality of chargers.

6. The system of claim 1, wherein the housing further includes a partition to divide an interior space into a first compartment and a second compartment.

7. The system of claim 6, wherein the partition includes openings to facilitate heat transfer.

8. The system of claim 1, wherein the first compartment includes a first liner with a first color to designate used battery packs, and the second compartment includes a second liner with a second color to designate fully charged battery packs.

9. The system of claim 1, wherein the plurality of protrusion members extend in an orthogonal direction with respect to the surface of the plate member.

10. The system of claim 1, wherein two protrusion members are disposed below each of the plurality of chargers.

11. A system, comprising:
a case configured to store and transport a power tool and a plurality of battery packs, the case includes:
a housing;
a partition member configured to form a plurality of compartments, the partition member being attachable/detachable from the housing; and
a lid; and
a charging system attached to an inside, front surface of the case, the charging system includes a charger having a plurality of charging ports to charge the plurality of battery packs, wherein the lid of the case includes a mesh window at a location that allows air flow and cools the charger system located inside of the case when the lid is closed.

12. The system of claim 11, wherein the partition member is substantially H-shape formed inside of the housing.

13. The system of claim 11, wherein the partition member is attachable/detachable from the housing using a hook and loop fastener.

14. The system of claim 11, further comprising a charger mounting system, the charger mounting system includes a pair of mounting devices and a pair of rivets.

15. The system of claim 14, wherein the pair of mounting devices is attached to a back surface of the charger located inside of the case.

16. The system of claim 15 wherein each of the mounting devices includes a first opening and a second opening to insert the respective rivets thereto, the first opening being larger than the second opening.

17. The system of claim 11, wherein the case includes an electric cord exit port on a same side where the charger is located in the case.

18. The system of claim 17, wherein the electric cord exit port includes a rubber cut-out portion.

19. The system of claim 11, wherein the plurality of charging ports of the charger are positioned parallel in relation to the front surface of the case.

20. A system, comprising:
a case configured to store and transport a power tool and a plurality of battery packs, the case includes:
a housing;
a partition member configured to form a plurality of compartments, the partition member being attachable/detachable from the housing; and
a lid; and
a charging system, the charging system includes a charger having a plurality of charging ports to charge the plurality of battery packs, the charging system includes at least one mounting device to attach the charging system to a rivet that is disposed on an inner surface of the case, the at least one mounting device includes a first opening and a second opening, a size of the first opening being smaller than a size of the second opening, the rivet configured to be inserted into the first opening.

* * * * *